United States Patent [19] [11] 4,285,640
Mukai [45] Aug. 25, 1981

[54] SWASH PLATE TYPE COMPRESSOR

[75] Inventor: Takamitu Mukai, Kariya, Japan

[73] Assignee: Kabushiki Kaisha Toyoda Jidoshokki Seisakusho, Aichi, Japan

[21] Appl. No.: 60,462

[22] Filed: Jul. 25, 1979

[30] Foreign Application Priority Data

Aug. 3, 1978 [JP] Japan ................................ 53-94931
Mar. 26, 1979 [JP] Japan ................................ 54-35789

[51] Int. Cl.[3] ........................ F04B 1/18; F16C 17/06
[52] U.S. Cl. .................................. 417/269; 308/3 C
[58] Field of Search ........................ 417/DIG. 1, 269; 308/3 C, DIG. 8; 428/681

[56] References Cited

U.S. PATENT DOCUMENTS

| | | | |
|---|---|---|---|
| 1,694,938 | 12/1928 | Harris | 308/3 C |
| 2,022,917 | 12/1935 | Larkin | 308/3 C |
| 2,277,496 | 3/1942 | Maines | 308/3 C |
| 3,727,524 | 4/1973 | Nishiyama | 417/DIG. 1 |
| 3,808,955 | 5/1974 | Hamada | 417/178 |
| 3,963,451 | 6/1976 | Kachik | 428/681 |
| 4,037,522 | 7/1977 | Inoshita | 308/DIG. 8 |

*Primary Examiner*—William L. Freeh
*Attorney, Agent, or Firm*—Burgess, Ryan & Wayne

[57] ABSTRACT

A swash plate type compressor for compressing a refrigerant of an air conditioning system incorporating therein a rotating swash plate made of an aluminum alloy, one or more compressor pistons reciprocating in a cylinder block for effecting compression of the refrigerant, and an operative engagement means which is between the swash plate and the piston or pistons. The operative engagement means is made of a carbon steel material and a flattened face of the operative engagement means contacting the aluminum alloy swash plate consisting of a cementation treatment layer formed in the carbon steel material of the operative engagement means.

5 Claims, 6 Drawing Figures

42
46
44
46
3b
1
2b
7
6
8
9
2a
10
9
8
1
3a
41
45
43
45
5
8
9
20
21

SWASH PLATE TYPE COMPRESSOR

FIELD OF THE INVENTION

The present invention relates generally to a swash plate type compressor of the kind wherein a reciprocal compressing motion of compressor pistons is caused by a rotating motion of a swash plate secured to a rotatable drive shaft, and more particularly relates to an improvement on a sliding part consisting of the swash plate and the operative engagement means which are intervened between the rotating swash plate and the reciprocating pistons.

The swash plate type compressor of the described kind has been very often adapted for a refrigerant compressor in air conditioning system for vehicles, since the operation of the compressor is very smooth and quiet. Further since the compression efficiency is high, many technical efforts have been made for improving performance and quality of swash plate type compressor. One marked technical effort was to eliminate an oil supply pump from a lubricating system incorporated in the swash plate type compressor in order to make a swash plate type compressor of as small as possible. Thus, a novel pumpless lubricating system for the swash plate type compressor was developed whereas an oil component suspended in the refrigerant is directly used for lubricating, not only the above-mentioned sliding part, but also the other movable elements, such as the pistons and bearing means incorporated into the swash plate type compressor. That is, according to this pumpless lubricating system, the oil suspended in the refrigerant returning from the air conditioning system or the lubricating oil separated from the oil suspended refrigerant within the compressor is distributed toward the above-mentioned sliding part and movable elements, without employing an oil supply pump. However, the above-mentioned pumpless lubricating system is objectionable in that during its operation, the compressor must be operated under a low load, at a speed slower than a given high speed range and the amount of the oil suspended in the refrigerant returned from the air conditioning system to the compressor is very small. Therefore, lubricating oil sufficient for appropriately lubricating the sliding part and the movable elements of the compressor is not acquired. As a result, rapid abrasion of the sliding part or the movable elements occurs, and in an extreme case, seizure of the sliding part or the movable elements occurs due to the generation of a high temperature friction heat, whereby the compressor will finally break down.

Additionally, when the swash plate type compressor is applied to the air conditioning of a vehicle, the compressor is usually placed in the engine compartment of the vehicle. Consequently, the compressor is subjected to the high temperature in the engine compartment. As a result, the compressor heats up. This heating up of the compressor is very remarkably high, especially if the engines are of the recent air pollution resistant type engines employed in the passenger cars. Consequently, the viscosity of the oil suspended in the refrigerant is lowered, whereby the lubrication effect of the oil is necessarily degraded.

A description will now be made concerning the general construction of a swash plate type compressor to which the present invention is applied, with reference to the illustrations of FIGS. 1 through 4, for the purpose of enabling a better understanding of the background of the present invention.

Referring to FIG. 1, illustrating a typical swash plate type compressor of recent use, the compressor has a pair of cylinder blocks, i.e. a front cylinder block **2*a* and a rear cylinder block 2*b*, combined with each other in an axial alignment, and thereby forming a combined cylinder block. The combined cylinder block is provided with axially extending cylinder bores 1 arranged in parallel with each other around the central axis of the combined cylinder block. The front end of the combined cylinder block is closed by a front housing 41, via a valve plate 3*a*, and the rear end of the combined cylinder block is closed by a rear housing 42, via a valve plate 3*b*. Coaxially passing through both cylinder blocks 2*a*, 2*b*, front housing 41, and front valve plate 3*a*, a drive shaft 5 is rotatably supported by a suitable bearing means, and is provided with a swash plate 6 secured to the middle of the drive shaft 5. The swash plate 6 is operatively connected with, via ball bearings 8 and shoes 9, double acting multi-pistons 7 which are slidably fitted in the cylinder bores 1. The combined cylinder block is also provided with a swash plate chamber 10 past which the swash plate 6 rotates by means of the drive shaft 5. The front housing 41 and the rear housing 42 are formed with refrigerant suction chambers 43 and 44, respectively, through which the refrigerant, having returned from an outside air conditioning system, is eventually sucked into the cylinder bores 1 in order to be subjected to a compression effect. The front and rear housings 41, 42 are also formed with refrigerant discharge chambers 45, 46, respectively, through which the compressed refrigerant is discharged toward the outside air conditioning system. Although not illustrated in FIG. 1, the compressor has some appropriate means for introducing a part or all of the oil suspended refrigerant returned from the outside air conditioning system into the swash plate 10 before the refrigerant enters into the suction chambers 43 and 44. The compressor also has a means for separating the oil from the returned refrigerant and for distributing the separated oil toward the diverse movable elements within the compressor. FIG. 2 is an enlarged view of the shoe 9 of FIG. 1 having a spherical recess for receiving therein the ball bearing 8. The shoe 9 and the ball bearing 8 received in said shoe 9 cooperate with one another for the purposes of establishing an operative engagement between the smash plate 6 and one of the pistons 7. That is, the ball bearing 8 and the shoe 9 act as an operative engaging means intervened between the swash plate 6, being a rotating element, and one of the pistons 7, being a reciprocating element. In this connection, the ball bearing 8 and the shoe 9 may be connected together as an integral member 20 shown in FIG. 3. The integral member 20 is also able to operate as the above-mentioned operative engagement means, if the member 20 is incorporated into the compressor of FIG. 1 for the replacement of the ball bearing 8 and the shoe 9. Further, the similar operative engagement means can be presented by a partial ball bearing 21 with one flat face, shown in FIG. 4. Therefore, the partial ball bearing 21 may be incorporated into the compressor of FIG. 1 for the replacement of the ball bearing 8 and the shoe 9**.

With the swash plate type compressor shown in FIG. 1, the sliding part consisting of the contacting surfaces of the swash plate 6 and the above-mentioned operative engaging means is a part that is the most difficult for maintaining a constant and appropriate lubricating state. This is because, during the high load operation of the compressor, a very large surface pressure reaching 100 through 150 $Kg/cm^2$ often acts in the above-mentioned sliding part. Also, in the case where the compression of a liquid state refrigerant takes place within the compressor, the surface pressure acting in the sliding part can reach 500 $Kg/cm^2$. The relative sliding speed between the swash plate 6 and the operative engaging means reaches a high speed of 10 through 20 m/sec. Further, the shoes 9 of the operative engagement means perform very complex motions during the operation of the compressor, whereby the relative position of the shoes with respect to the surface of the swash plate 6 frequently varies. Thus, the complex motion of the shoes 9 prevents the formation of a film of the lubricating oil on the sliding part. As a result, metal contact takes place in the sliding part, causing rapid abrasion of the sliding part and seizure of the operative engaging means to the surface of the swash plate 6 may possibly occur.

For obviating the foregoing defects, in the case where the swash plate 6 is made of ferrous material, it has been proposed to use shoes having a contacting face, consisting, respectively, of a layer of an alloy of copper and lead, since the alloy of copper and lead exhibits excellent abrasion and seizure resistances against the ferrous material. In fact, such shoes having a contacting face coated with a layer of the alloy of copper and lead could considerably contribute to cancelling of the above-described defects.

On the other hand, the cylinder blocks 2*a*, 2*b*, the front and rear housings 41, 42 and the pistons 7 of the swash plate type compressor of FIG. 1 can be made of an aluminum alloy for the purpose of acquiring a light weight swash plate type compressor. In addition, swash plates can also be made from an aluminum alloy for achieving an even lighter weight swash plate type compressor. It has been proposed to employ a high silica aluminum alloy containing 13 through 30 wt % silica as one appropriate material of which the swash plate is made. The high silica aluminum alloy has a mechanical strength and an abrasion resistance sufficient for use as a material for the swash plate. However, the replacement of the swash plate made of ferrous material with a swash plate made of the above-mentioned high silica aluminum alloy material causes the following defect. Since the high silica aluminum alloy material includes therein proeutectic and/or eutectic crystal silica in the scattered state, and the proeutectic and/or eutectic crystal silica are very hard materials (for example, the proeutectic crystal silica has a hardness reaching 1300 through 1500 Hv), the swash plate made of the high silica aluminum alloy causes the contact surface of the shoe 9 or of the operative engagement means to become rough during the sliding operation of the swash plate. During the sliding operation of the swash plate and the shoes or the operative engagement means, the above-mentioned proeutectic and/or eutectic crystal silica scattered in the high silica aluminum alloy material operate to scratch the contact surface of the shoes 9 or the operative engagement means generate abrasion powders due to the scratching of the shoes 9 or the operative engagement means. The scratched contact surface of the shoes 9 or the operative engagement means and the abrasion powders in turn scratch soft portions of the high silica aluminum alloy of which the swash plate is made. As a result, the crystal silica scattered in the high silica alluminum alloy drops out of the aluminum alloy. Consequently, the dropped crystal silica acts as abrasion material in the sliding part consisting of the contacting surfaces of the swash plate 6 and the shoes 9 or the operative engagement means. Therefore, rapid abrasion or wear of the sliding part occurs. Further, the rough contact surfaces of the swash plate 6 and the shoes 9 or the operative engagement means increase the friction coefficient of the sliding part. Therefore, during the sliding motion of the sliding part, a high friction heat is generated which may causes the seizure of the sliding part.

SUMMARY OF THE INVENTION

A primary object of the present invention is to provide an improved operative engagement means intervened between a light weight swash plate made of a high silica aluminum alloy and axially reciprocable pistons of a swash plate compressor, whereby the above-mentioned defects related to the sliding part of the compressor consisting of the contacting surfaces of the swash plate and the operative engagement means are obviated.

Another object of the present invention is to provide a swash plate type compressor that is light in weight and excellent in its durability in use.

When the swash plate made of a high silica aluminum alloy is incorporated into a swash plate type compressor, the operative engagement means of the swash plate type compressor sliding on the surface of the swash plate should be made of a material provided with the following properties:

(1) The surface of the operative engagment means must have a hardness equal to or greater than that of particles of the silica included in the high silica aluminum alloy material of the swash plate, in order to prevent the surface of the operative engagement means from being abraded by the silica particles while the operative engagement means slides on the contacting surface of the swash plate.

(2) The surface of the operative engagement means sliding on the contacting surface of the swash plate must have a sufficient resistance to seizure and have a low friction coefficient.

(3) Hardness, mechanical strength and chemical property of the material of which the operative engagement means is made, must be invariable even if said material is subjected to a high temperature up to about 570 degrees centigrade which is a eutectic point of the high silica aluminum alloy material of which the swash plate is made.

(4) The surface of the operative engagement means, sliding on the contact surface of the swash plate, can be a precisely finished metallic surface having the properties as described in items (1) through (3), above.

(5) The production process of the operative engagement means is not complicated.

The present inventor has made investigations and conducted experiments with a view to procuring a material having all of the above-mentioned properties. As a result, it was found that a metal of carbon steel having, in the surface thereof, a particular treatment layer, which will be referred to as a cementation treatment layer throughout the specification of the present patent application, is able to have all of the properties described in items (1) through (5), above.

Therefore, in accordance with the present invention, there is provided a swash plate type compressor comprising at least a cylinder block having therein at least one cylinder bore, a compressor piston reciprocally fitted in said cylinder bore for effecting compression of a refrigerant, a drive shaft axially passing through said cylinder block and rotatably supported by a bearing means, a swash plate secured onto said drive shaft to be rotated by said drive shaft thereby causing a reciprocal motion of said piston, and at least an operative engagement means for establishing an operative engagement between said swash plate and said piston, said operative engagement means having a flattened face slidably contacting said swash plate, wherein said swash plate is made of a high silica aluminum alloy and wherein said operative engagement means is made of a carbon steel material, said flattened face of said operative engagement means consisting of a cementation treatment layer formed in said carbon steel material of said operative engagement means.

Preferably, the cementation treatment layer is a boron diffused steel layer.

Further preferably, the cementation treatment layer may be a carbide layer of an element selected from the elements belonging to V B and VI B groups of the periodic table, the carbide layer being formed by diffusing the selected element into the carbon steel material.

DETAILED DESCRIPTION OF THE INVENTION

Figures 1, 2, 3, 4:
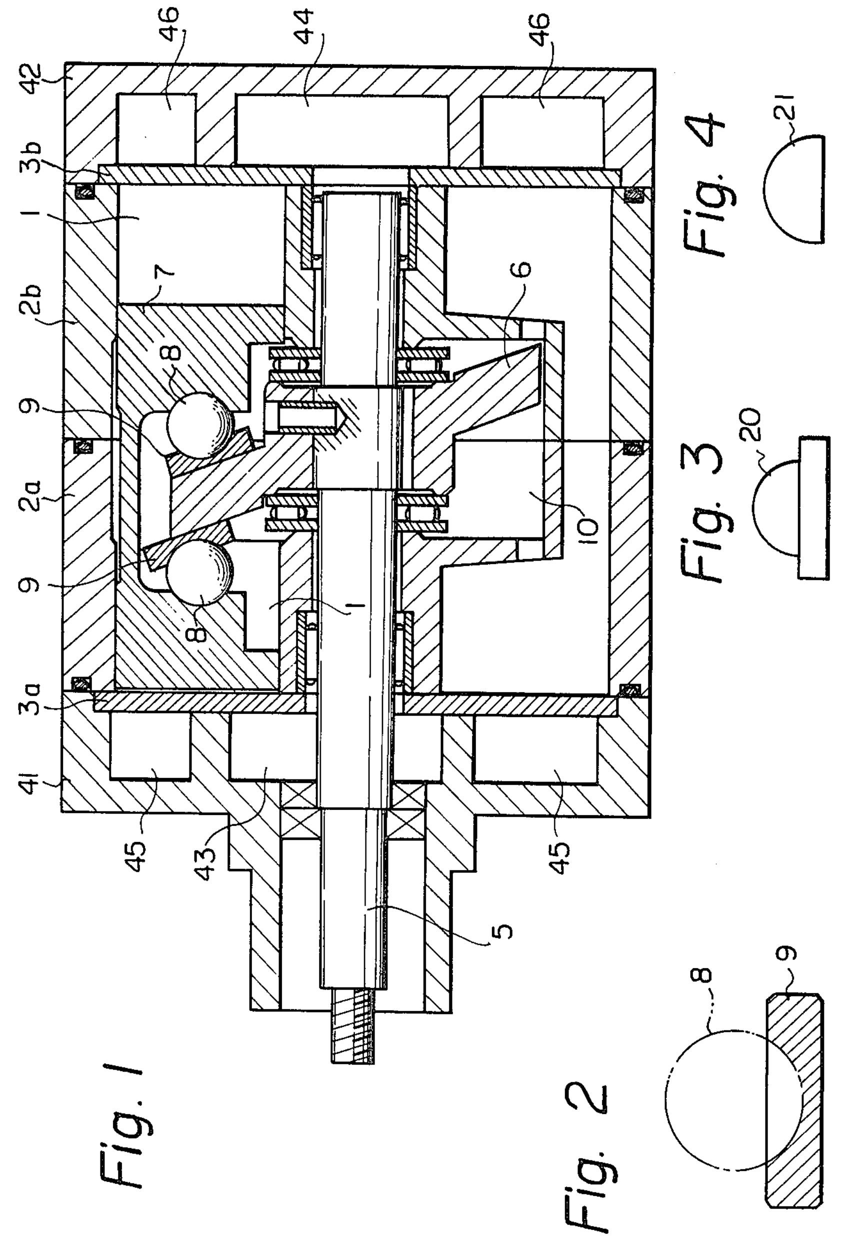
FIG. 1 is a longitudinal cross-sectional view of a typical swash plate type compressor to which the present invention is applied.
FIG. 2 is an enlarged cross-sectional view of a shoe and an enlarged perspective view of a ball bearing received in the shoe, both the shoe and the ball bearing being incorporated into the swash plate type compressor of FIG. 1.
FIGS. 3 and 4 are perspective views of an operative engagement means, respectively, which are capable of being incorporated into the swash plate type compressor of FIG. 1 for replacement of the combination of the shoes and ball bearing of FIG. 2.

In accordance with the present invention, the swash plate 6 is made of a high silica aluminum alloy material. In a practical production method, the swash plate 6 is produced by applying machining processes to a high silica aluminum alloy bar. The swash plate 6 may be produced by applying a die casting process to a high silica aluminum alloy material, although some finish machining process will be needed to complete a final product of the swash plate 6. Further, in accordance with one embodiment of the present invention, the shoe 9 forming a part of the operative engagement means between the swash plate 6 and one piston 7, is produced in the following processes. That is, in the first process, a half product of the shoe 9, having the same shape as that shown in FIG. 2 is produced by pressing from a cold weld steel material and by applying a grinding process to the pressed product. In the second process, the half product of the shoe 9 is immersed for several hours into a fused salt bath medium which includes a borax ($Na_2B_4O_7$) and a 10 through 40 weight percent of a silica carbide or a boron carbide and which is kept at 800 through 1100 degrees centigrade. As a result, the shoe 9 having, in the surface thereof a boron diffused layer, is completed. Alternatively, in the second process, the boron diffused layer may be formed by applying an electrolytic process to the half product of the shoe 9. That is, the half product of the shoe 9 is immersed, as a negative electrode, for several hours into a fused salt bath medium which includes borax, a mixture of borax and a silica carbide, or a mixture of borax and a sodium chloride, and which is kept at 800 through 1100 degrees centigrade. According to the foregoing second process, the boron diffused layer formed in the surface of the shoe 9, which is to be referred to as a cementation treatment layer, has a thickness of 0.02 through 0.15 millimeter and has a hardness of 1300 through 2000 in the Vickers hardness scale. Therefore, the boron diffused layer can be a very hard layer. Further, the boron diffused layer consists of either a single layer of $Fe_2B$ or combination layer of FeB and $Fe_2B$. After the second process, the shoe 9 is subjected to a honing process so that a slight surface roughness on the surface of the shoe 9, which has been formed during the second boron diffusing process, is completely removed. Thus, the production of the shoe 9 is completed. Thereafter, the completed shoe 9 is incorporated in a swash plate type compressor. It should be understood that the shoe 9 with the above-mentioned boron diffused layer in the surface thereof is able to have a fine surface the hardness of which is equal or greater than that of the proeutectic and eutectic silica included in the swash plate 6 made of a high silica aluminum alloy material. Therefore, the shoe 9 with the boron diffused layer has an excellent slidable property, as well as excellent resistances to abrasion and seizure. Further, the boron element included in the boron diffused layer of the shoe 9 has a very poor affinity to aluminum material. This fact is very effective for providing excellent abrasion and seizure resistance properties for the shoe 9.

It should further be understood that during the foregoing boron diffusing treatment process, any appreciable deformation of the shoe 9 does not occur, although the shoe 9 is exposed to a high temperature of 800 through 1100 degrees centigrade. Even if the shoe 9 is deformed under the influence of the high temperature, such deformation will be one that the face of the shoe 9 in contact with the swash plate 6 within the compressor becomes a slightly convexed surface, due to the fact that the shoe 9 is formed with a spherical recess in the other face of the shoe 9 opposite to the above-mentioned contacting surface. In fact, it was found that the amount of deformation is only several micrometers at the maximum. However, it should be understood that the above-mentioned convexed contacting face of the shoe 9 is very effective for forming an oil film between said convexed contacting face of the shoe 9 and the surface of the swash plate 6 during the operation of the compressor.

In accordance with the other embodiment of the present invention, the shoe 9 forming a part of the operative engagement means between the swash plate 6 and one piston 7, is produced in the following process. That is, in the first process, a half product of the shoe 9, having the same shape as that shown in FIG. 2 is produced by the same or like method as that in the case of the afore-mentioned first embodiment. In the second process, the half product of the shoe 9 is immersed for 5 through 10 hours into a fused salt bath medium including borax ($Na_2B_4O_7$) to which a ferric or ferrous compound of one or more elements selected from elements belonging to V B group (V, Nb, Ta) or VI B group (Cr, Mo, W) of the periodic chart. The fused salt bath medium is kept at 900 through 1000 degrees centigrade. During the immersion of the half product of the shoe 9 into the above-mentioned fused salt bath medium, the borax acts as a transferring medium for supplying the above-mentioned elements into the surface of the half product of the shoe 9. Thus, the supplied elements combine with carbon elements in the surface of said half product so as to form a carbide layer. As a result, the shoe 9, having in the surface thereof a carbide layer, is completed. Alternatively, the second process for producing a carbide layer into the surface of the half product of the shoe 9 may employ an electrolytic process or a powder metallurgy process. The carbide layer, formed in the surface of the shoe 9 by the second process, has a thickness of 10 through 50 micrometers and has a hardness of 2,000 through 3,000 Hv in the Vickers hardness scale. Therefore, the carbide layer can be a very hard layer. After the second process, the shoe 9 is subjected to a honing process so that any appreciable roughness on the surface of the shoe 9, which has been formed during the second process is completely removed, and after the honing treatment, no other after-treatment is needed to obtain a complete product of the shoe 9. The complete product of the shoe 9 is now ready to be incorporated into a swash plate type compressor. The shoe 9 with the above-mentioned carbide layer in the surface thereof has a fine and smooth surface, and the hardness of the carbide layer is equal to or greater than that of the proeutectic and eutectic silica included in the swash plate 6 made of a high silica aluminum alloy material. Therefore, the shoe 9 with the carbide layer has an excellent slidable property as well as excellent resistance to abrasion and seizure.

It should be understood that during the foregoing process for forming the carbide layer in the surface of the shoe 9, appreciable deformation of the shoe 9 does not occur, although the shoe 9 is exposed to a high temperature of 800 through 1100 degrees centigrade. Even if any slight deformation of the shoe 9 occurs under the influence of the high temperature, such deformation will be one that the face of the shoe 9 in contact with the swash plate 6 within the compressor becomes a slightly convexed surface, due to the fact that the shoe 9 is formed with a spherical recess in the face opposite to the above-mentioned face which is in contact with the swash plate 6. In fact, it was confirmed by the inventor that the maximum amount of the deformation is only several micrometers. However, it should be understood that the above-mentioned convexed contacting face of the shoe 9 is advantageous, since a lubricating oil film is formed between the convexed contacting face of the shoe 9 and the surface of the swash plate 6 during the operation of the compressor, so that the metal contact between the shoe 9 and the swash plate 6 is prevented.

In order to clarify the operation and the advantageous effect of the present invention, a description will be provided hereinbelow with respect to some experimental tests conducted by the inventor.

For conducting the experimental tests, a number of test pieces of the shoe 9 of the present invention and of the conventional type were prepared. The first test pieces of the shoe 9 of the present invention were made of a carbon steel (Japanese Industrial Standard G3102, Class S45C), and formed with a boron diffused layer in the surface of each test piece. The surface hardness of each test piece was 1400 through 1800 Hv in the Vickers hardness scale. The second test pieces of the shoe 9 of the present invention were made of the same carbon steel material as the first test pieces, and formed with a carbide layer in the surface of each test piece. The surface hardness of each of the second test pieces was 2000 through 3000 Hv in the Vickers hardness scale. The test pieces of the conventional type shoe 9 were made of an alloy of a copper including 24 weight percent lead and 3.5 weight percent tin.

Experimental Test I

The test was conducted so as to measure frictional coefficients of the above-mentioned first test pieces of the shoe of the present invention and the test pieces of the conventional type shoe as well as temperature rise caused by the frictional heat generated during the motion of the former and latter test pieces under the preselected test conditions stated hereinafter. That is, the above-mentioned measurement was carried out during the period the test pieces were pressed against some selected rotating discs and during the period the pressure was gradually increased. The rotating discs against which the first test pieces of the shoe of the present invention were pressed were made of a high silica aluminum alloy including 20 weight percent silica, and the rotating disc against which the test pieces of the conventional type shoe were pressed were made of a spherulitic graphite cast iron.

The selected test conditions common to both test pieces were as follows.

(1) The sliding speed: 13 m/sec (constant)

(2) The pressure: The pressure was increased from 40 $Kg/cm^2$ by increments of 20 $Kg/cm^2$ each to about 180 $Kg/cm^2$. Each pressure was applied for thirty minutes.

(3) The lubricating oil used: A low viscosity oil SSU (Saybolt Universal Seconds) 70.

(4) The lubricating method: The lubricating oil is supplied at the rate of 0.8 cc/minute by using a felt cloth.

(5) The surface roughness of the test pieces: The maximum roughness was 0.4 through 0.6.

(6) The surface roughness of the discs: The maximum roughness was 0.4 through 0.6.

Figure 5:
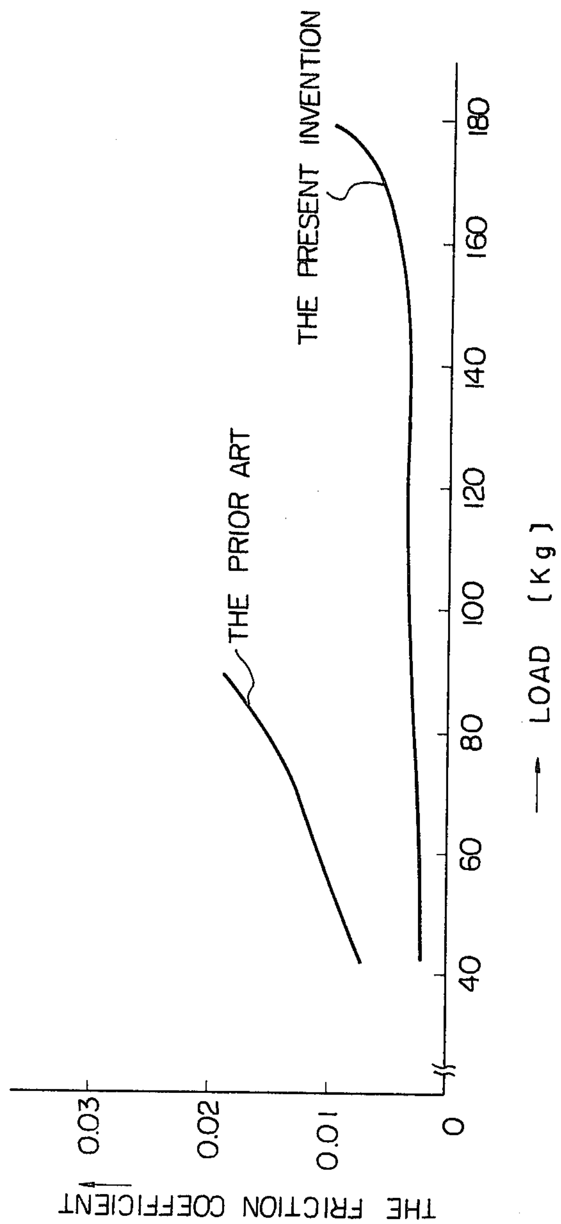
FIGS. 5 and 6 are graphs illustrating the test results conducted for comparing the friction coefficient and the amount of friction heat generated in a shoe producted in accordance with the present invention and those of a shoe of the prior art.
Figure 6:
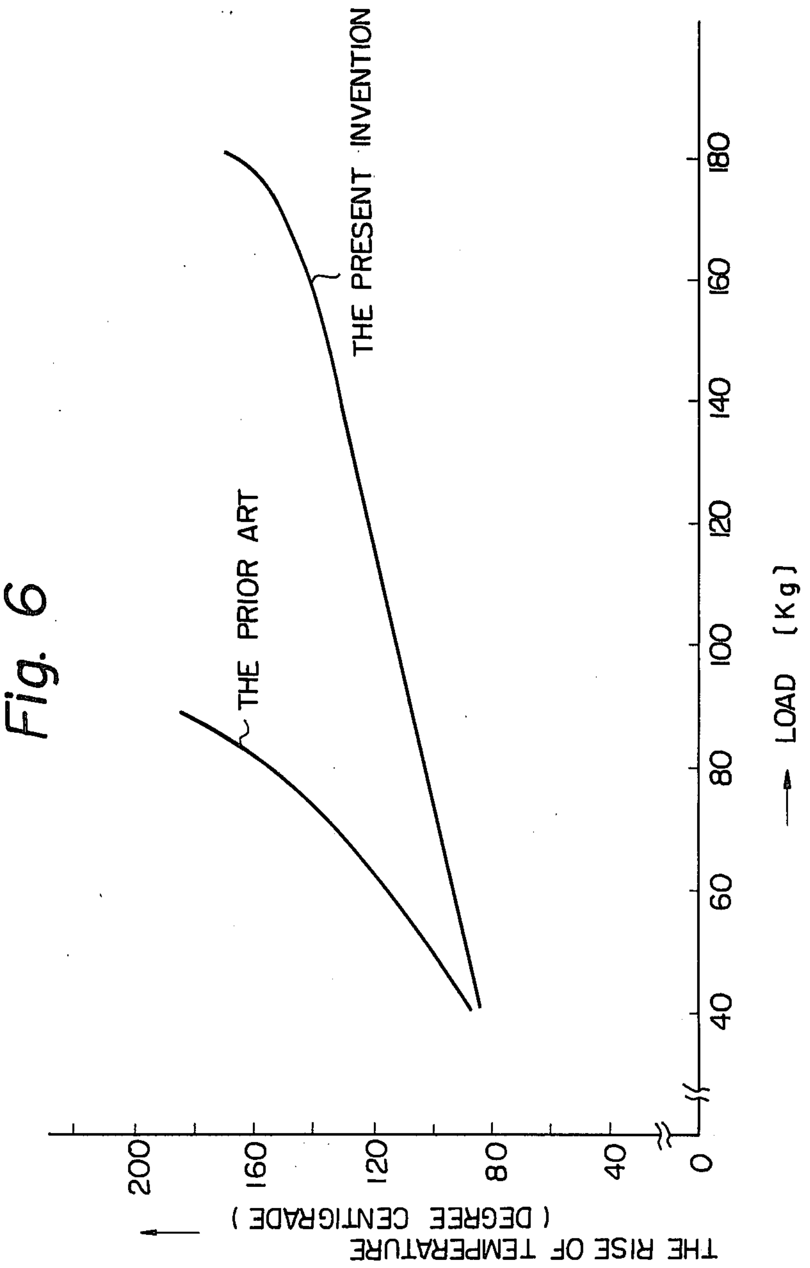

The measurement results are shown in FIGS. 5 and 6, respectively. As is indicated in FIG. 5, the frictional coefficient of the first test pieces was lower than that of the test pieces of the conventional type shoe over the entire pressure range, and was kept almost constant without being affected by an increase in the pressure. Further, as is indicated in FIG. 6, the temperature rise caused by the frictional heat in the case of the first test pieces of the shoe of the present invention was lower than that in the case of the test pieces of the conventional type shoe over the entire pressure range. From these test results, it was confirmed that, according to the present invention, the sliding part of the rotating swash plate and the operative engagement means can have an excellent slidable property and an excellent resistance to rapid abrasion wear and seizure, even if a low viscosity lubricating oil is used. It should be understood that this fact is very effective for the durability of a swash plate type compressor used as an indispensable element of an air conditioning system of a vehicle.

A similar experimental test was conducted with regard to the afore-mentioned second test pieces of the shoe of the present invention, and substantially the same test results as indicated in FIG. 5 and FIG. 6 were exhibited.

Experimental Test II

Experimental test II was conducted so as to inspect whether or not the afore-mentioned first test pieces of the shoe of the present invention and the test pieces of the conventional type shoe can exhibit a satisfactory operation when these test pieces are incorporated in practical swash plate type compressors. Naturally, when the test pieces of the shoe of the present invention were inspected, a swash plate made of a high silica aluminum alloy was employed. On the other hand, when the test pieces of the conventional type shoe were inspected, a swash plate made of a spherulitic graphite cast iron was employed. Experimental test II was conducted under the following operation conditions, including the tightest lubricating condition practical for use in a compressor.

(1) The type of a compressor: A swash plate type compressor having a total piston displacement of 150 cubic centimeters.

(2) The number of rotations: 4,000 r.p.m.

(3) The discharge pressure of the refrigerant gas (Pd): Pd equals to 4 through 5 $Kg/cm^2$.

(4) The suction pressure of the returned refrigerant gas from the outside air conditioning circuit (Ps): Ps equal to about −50 mm Hg.

(5) The operation time: 20 hours.

(6) The lubricating oil used: A refrigerator oil of 150 cubic centimeters.

(7) The amount of the refrigerant gas: 100 grams, which is one tenth of the amount required for a practical use in the compressor.

As a result of the experimental test II, it was found that after 20 hours of operation of the compressors, the compressor which includes the test pieces of the shoe of the present invention did not exhibit any abnormal state, and that the compressor which includes the test pieces of the conventional type shoe exhibited an occurence of seizure.

From the foregoing test results of experiment test II, it was confirmed that the present invention is an excellent invention for improving a swash plate type compressor, particularly when used for air conditioning of a vehicle. Further, during this experimental test II, it was confirmed that the swash plate type compressor with the test pieces of the shoe of the present invention and the high silica aluminum alloy swash plate is lighter in weight than the swash plate type compressor with the test pieces of the conventional type shoe and the spherulitic graphite cast iron swash plate by 300 grams. More specifically, it was confirmed that the employment of the swash plate made of the high silica aluminum alloy makes it possible to decrease the weight of a swash plate to be incorporated into a swash plate type compressor by 63 percent of the weight of the swash plate made of the spherulitic graphite cast iron. It was further confirmed that the above-mentioned weight of 300 grams causes reduction in the entire weight of a swash plate compressor by 6.5 percent of the weight of the swash plate type compressor with the test pieces of the conventional type shoe and the swash plate made of the spherulitic graphite cast iron.

Another experimental test like the above-mentioned experiment test II was conducted with regard to the previously mentioned second test pieces of the present invention, and substantially the same test results were realized.

From the foregoing description, it should be understood that according to the present invention, the entire weight of a swash plate type compressor can be decreased by the employment of a swash plate made of an aluminum alloy material, whereby when the weight-reduced swash plate type compressor is mounted on a vehicle, it contributes to reduction in the load applied to an engine of the vehicle. Further, the combination of the swash plate made of the high silica aluminum alloy and the shoes with a cementation treatment layer, which is a boron diffused steel layer or a carbide layer, according to the present invention, provides a light weight durable swash plate type compressor.

It should further be understood that the foregoing description has preferred embodiments of a swash plate type compressor and that some changes may be made in the invention without departing from the spirit and scope thereof. For example, for further increasing the slidable property of the sliding part between the swash plate and the operative engagement means, the swash plate may be made of a high silica aluminum alloy including a small amount of lead, tin or both of these metals.

What is claimed is:

1. A swash plate type compressor comprising: a cylinder block having therein at least one cylinder bore; a compressor piston reciprocally fitted in said cylinder bore for effecting compression of a refrigerant; a drive shaft axially passing through said cylinder block and rotatably supported by bearing means; a swash plate secured onto said drive shaft rotated by said drive shaft thereby causing a reciprocal motion of said piston, and an operative engagement means for establishing an operative engagement between said swash plate and said compressor piston, said operative engagement being formed with a flattened face slidably contacting said swash plate, wherein said swash plate is made of a high silica aluminum alloy, and wherein said operative engagement means is made of a carbon steel material, and wherein said flattened face of said operative engagement means comprises a boron diffused steel layer formed in said carbon steel material of said operative engagement means.

2. Swash plate type compressor as claimed in claim 1, wherein said operative engagement means comprises a partial ball bearing having said flattened face.

3. Swash plate type compressor as claimed in claim 1, wherein said high silica aluminum alloy of which said swash plate is made includes lead, tin or a mixture thereof.

4. Swash plate type compressor as claimed in claim 1, wherein said operative engagement means comprises a shoe having said flattened face and an opposite face formed therein with a spherical recess, and a ball bearing received in said spherical recess of said shoe.

5. Swash plate type compressor as claimed in claim 4, wherein said shoe and said ball bearing are integral with one another.

* * * * *